USOO6122624A

United States Patent [19]
Tetro et al.

[11] Patent Number: 6,122,624
[45] Date of Patent: Sep. 19, 2000

[54] SYSTEM AND METHOD FOR ENHANCED FRAUD DETECTION IN AUTOMATED ELECTRONIC PURCHASES

[75] Inventors: Donald Tetro; Edward Lipton, both of Fort Lauderdale; Andrew Sackheim, Davie, all of Fla.

[73] Assignee: Automated Transaction Corp., Pembroke Pines, Fla.

[21] Appl. No.: 09/086,121

[22] Filed: May 28, 1998

[51] Int. Cl.[7] .................................................. G06F 17/60
[52] U.S. Cl. ............................................................ 705/44
[58] Field of Search ................................ 705/44, 39, 64, 705/67

[56] References Cited

U.S. PATENT DOCUMENTS

| Re. 32,985 | 7/1989 | Nagata et al. | 364/401 |
|---|---|---|---|
| 3,872,438 | 3/1975 | Cuttill et al. | 340/149 A |
| 4,317,957 | 3/1982 | Sendrow | 178/22.08 |
| 4,439,670 | 3/1984 | Basset et al. | 235/382 |
| 4,472,626 | 9/1984 | Frid | 235/379 |
| 4,498,000 | 2/1985 | Decavele et al. | 235/380 |
| 4,594,663 | 6/1986 | Nagata et al. | 364/401 |
| 4,947,027 | 8/1990 | Golightly | 235/448 |
| 4,947,028 | 8/1990 | Gorog | 235/381 |
| 5,012,077 | 4/1991 | Takano | 235/380 |
| 5,163,086 | 11/1992 | Ahearn et al. | 379/91 |
| 5,177,342 | 1/1993 | Adams | 235/379 |
| 5,202,826 | 4/1993 | McCarthy | 364/405 |
| 5,282,247 | 1/1994 | McLean et al. | 380/4 |
| 5,365,046 | 11/1994 | Haymann | 235/380 |
| 5,426,281 | 6/1995 | Abecassis | 235/379 |
| 5,457,305 | 10/1995 | Akel et al. | 235/379 |
| 5,845,285 | 12/1998 | Klein | 707/101 |

OTHER PUBLICATIONS

Phillips Business Information, "Innovative Strategies for Busting Fraud," Financial Services Report, vol. 13, No. 1, Jan. 1996.

The Oregonian Publishing Company, "TRW's Credit Report Offer Free—But Not Hassie–Free," Oregian, Fourth Edition, Business Section, p. E09, Jun. 1992.

"Bilingual Report System Links U.S., Puerto Rico," Bank New Product News, p. 29, Jun. 1991.

(List continued on next page.)

Primary Examiner—Eric W. Stamber
Assistant Examiner—Susanna Meinecke-Díaz
Attorney, Agent, or Firm—Price, Gess & Ubell

[57] ABSTRACT

A method and system for enhanced fraud detection in electronic purchase transactions from a remote site. A user at a remote terminal attempting to conduct an electronic purchase is prompted to input the user's billing address and social security number, where this information is used to verify the billing address of the user. Initially, the input social security number is communicated to a local account database containing information about customers as identified by their social security number. If the local account database contains the input social security number, then a determination is made whether the account associated with that social security number has been authorized for use. If authorization for the purchase transaction is not initially approved or refused according to the information provided in the local account database, then the social security number input by the user is next checked to determine if it corresponds to the user. A database having a stored list of social security numbers is accessed, wherein each of the stored social security numbers includes at least one address stored therewith corresponding to an address of an individual identified by the respective social security number. The addresses stored in association with the input social security number are retrieved and compared with the input address to determine if the input address corresponds to any of the retrieved stored addresses. If a match occurs between the user's input billing address and any of the retrieved stored addresses, the electronic purchase transaction is authorized to transpire.

26 Claims, 6 Drawing Sheets

OTHER PUBLICATIONS

"Legislator's Privacy Bills Target Abuse of Credit Card Numbers," San Jose Mercury News, Stock Final Edition, Front Section, p. 1A, Jun. 1990.

Dennis, Sylvia, "Lightbridge Ships Anti Cellular Subscription Fraud Systems", Newsbytes News Network, p. N/A., Dec. 1996.

"Prepared Statement of Mr. Schrader," Visa U.S.A., Inc., Subfile FNS., Jul. 1998.

Parker, Tammy, "The Twists and Turns of Fraud," Telephony, vol. 231, No. 19, p. S18(4), Nov. 1996.

Phillips Business Information, "Mom and Pop Operation Focuses on Fraud," Credit Risk Management Report, vol. 6, No. 8, Apr. 1996.

SYSTEM AND METHOD FOR ENHANCED FRAUD DETECTION IN AUTOMATED ELECTRONIC PURCHASES

BACKGROUND OF THE INVENTION

1. Field of the Invention

The present invention relates generally to a direct billing address verification system, and specifically to an improved automated system and process for detecting and preventing fraud by a remote purchaser in an electronic transaction.

2. Description of Related Art

Electronic purchase transactions performed from a remote site and transmitted electronically over computer networks via the "Internet" or phone lines via audiotext systems have recently gained widespread use. In such electronic purchases, the purchaser either supplies credit card information to the vendor or the vendor directly bills the purchaser for the particular transaction. While certain safeguards preventing the fraudulent use of credit cards exist, such safeguards are not effective in preventing fraud by purchasers who are billed directly for their purchase. These purchasers may simply provide a false name and address to a vendor for billing purposes when making a purchase from the remote location, which leaves the vendor little recourse in recovering the amount of the purchase when a bill is sent to the false address. Further, purchasers sometimes move their residence in the interim between the time of their purchase transaction and when they are billed. This makes it difficult for vendors to locate the purchaser at their new address in order to obtain payment for the purchase transaction.

One possible security measure for preventing fraud in direct billing practices is to check the name and address of the purchaser against a telephone directory to confirm the purchaser's name and address correlate. However, an address verification system of this type is not entirely effective in preventing fraud on the vendor. Individuals usually carry personal identification in their wallets, such as the individual's driver's license. A thief who steals the individual's wallet will have access to the individual's personal identification, so that the thief will know the individual's address and will be able to satisfy a simple address verification test which utilizes telephone listings. Thus, current address verification systems have not been successful in entirely eliminating fraudulent direct billing transactions.

Another security measure developed to prevent fraudulent electronic purchase transactions is the use of automated number identification (ANI) blocking. Since almost all electronic transactions are performed from remote terminals connected through telephone lines, the vendor may automatically collect the telephone number associated with the telephone line of the remote device from the telephone carrier. The vendor possesses a stored list of telephone numbers associated with a pattern of fraudulent use, wherein the ANI collected is compared with the stored list to determine if a match exists. If the ANI collected is on the stored list, then that telephone line is blocked from further use. ANI blocking is effective in preventing continued fraudulent usage from a particular phone number. However, ANI blocking is also of limited usefulness, because it labels a telephone number used on one occasion for a fraudulent transaction as a blocked phone number. Even though the telephone number and purchaser's billing address may not be interrelated, the telephone number will be blocked from any further purchase transactions. The next purchase transaction attempted using that telephone number may be a valid transaction, but the transaction will be denied since the telephone number has been blocked by ANI blocking. Thus, remote terminals frequently having a plurality of different users, such as hotel room telephones or pay phones, will be blocked by ANI blocking by one fraudulent use, preventing subsequent valid purchase transactions from being performed from that remote terminal. While ANI blocking is effective in preventing repeated fraudulent purchase transactions from occurring from the same remote terminal, it also has the detrimental effect of preventing subsequent valid purchase transactions from being performed from the same remote terminal.

Clearly, there is a need for a method for a more efficient and secure method for preventing fraudulent purchase transactions from a remote site by purchasers billed directly by the vendor for their purchase.

OBJECTS AND SUMMARY OF THE INVENTION

It is a primary object of the present invention to overcome the aforementioned shortcomings associated with the prior art.

Another object of the present invention is to provide a more effective system and method for detecting fraud in purchase transactions from a remote site in which the purchasers are billed directly by the vendor for their purchase.

A further object of the present invention is to provide a system and method for enhanced fraud detection in purchase transactions from a remote site by utilizing identifying data that is not readily attainable by a fraudulent user.

It is still another object of the present invention to provide a system and method for enhanced fraud detection in purchase transactions from a remote site by utilizing identifying data which is reliably related to the billing address of the purchaser.

These as well as additional objects and advantages of the present invention are achieved by providing a method and system for authorizing an electronic purchase transaction from a remote site having enhanced measures for detecting fraudulent transactions. A user at a remote terminal, such as a telephone or personal computer, attempting to conduct a purchase transaction is prompted by an automated transaction processing system to input the user's address, telephone number, and social security number. The information input by the user is retrieved and used for identification purposes.

Initially, the input social security number is communicated to a local account database containing information about customers as identified by their social security number. If the local account database contains the input social security number, then a determination is made whether the account associated with that social security number has been authorized for use. For instance, it is determined whether the input social security number has been blocked due to past fraudulent use or whether the account associated with the input social security number has exceeded a predetermined threshold. If the input social security number falls into any of these categories, then authorization for the purchase is refused.

It is further determined whether the account associated with the input social security number has been in the local account database for longer than a predetermined period of time. If the account has been in existence for longer than the predetermined period, then a further determination is made to ensure that the input address corresponds to an address stored in the local account database as identified by the social security number. If either the address matches or the account has been in the local account database for less than the predetermined period of time, then authorization for the purchase is approved.

If the social security number input by the purchaser is not found in the local account database, then a central database having a stored list of social security numbers is accessed, wherein each of the stored social security numbers includes at least one address stored therewith corresponding to an address of an individual identified by the respective social security number. The input social security number is compared with the stored list to confirm that the input social security number is an actual social security number appearing on the stored list. The addresses stored in association with the input social security number are then retrieved, and the input address is compared with the retrieved stored addresses to determine if the input address corresponds to any of the retrieved stored addresses. If the address input by the user matches any of the retrieved addresses stored in association with the input social security number, the purchase transaction is authorized and allowed to transpire. The purchase transaction is denied when any of the tests performed are not satisfied, and the user is notified the reason for which the transaction is refused.

As a further fraud detecting measure prior to accessing the central social security number database, the automated transaction processing system may collect the phone number from which the remote terminal is communicating. The collected phone number is compared with a stored list of blocked phone numbers which are not authorized to perform purchase transactions. If the collected phone number does not appear on the stored list, then the authorization procedure proceeds to the steps associated with the central social security number database. When the collected phone number appears on the stored list of blocked phone numbers, a separate database containing phone numbers and associated names and addresses is accessed to retrieve the addresses associated with the collected phone number. A comparison is made to determine if the retrieved addresses match the address input by the purchaser. If a match occurs, then the authorization procedure proceeds to the steps associated with the central social security number database to further verify the billing address input by the user. If the collected phone number does not appear in this database or if no match occurs between a retrieved address and the input address, then authorization for the purchase is refused.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide enhanced fraud detection in automated electronic billing address verification processing.

Figure 1:
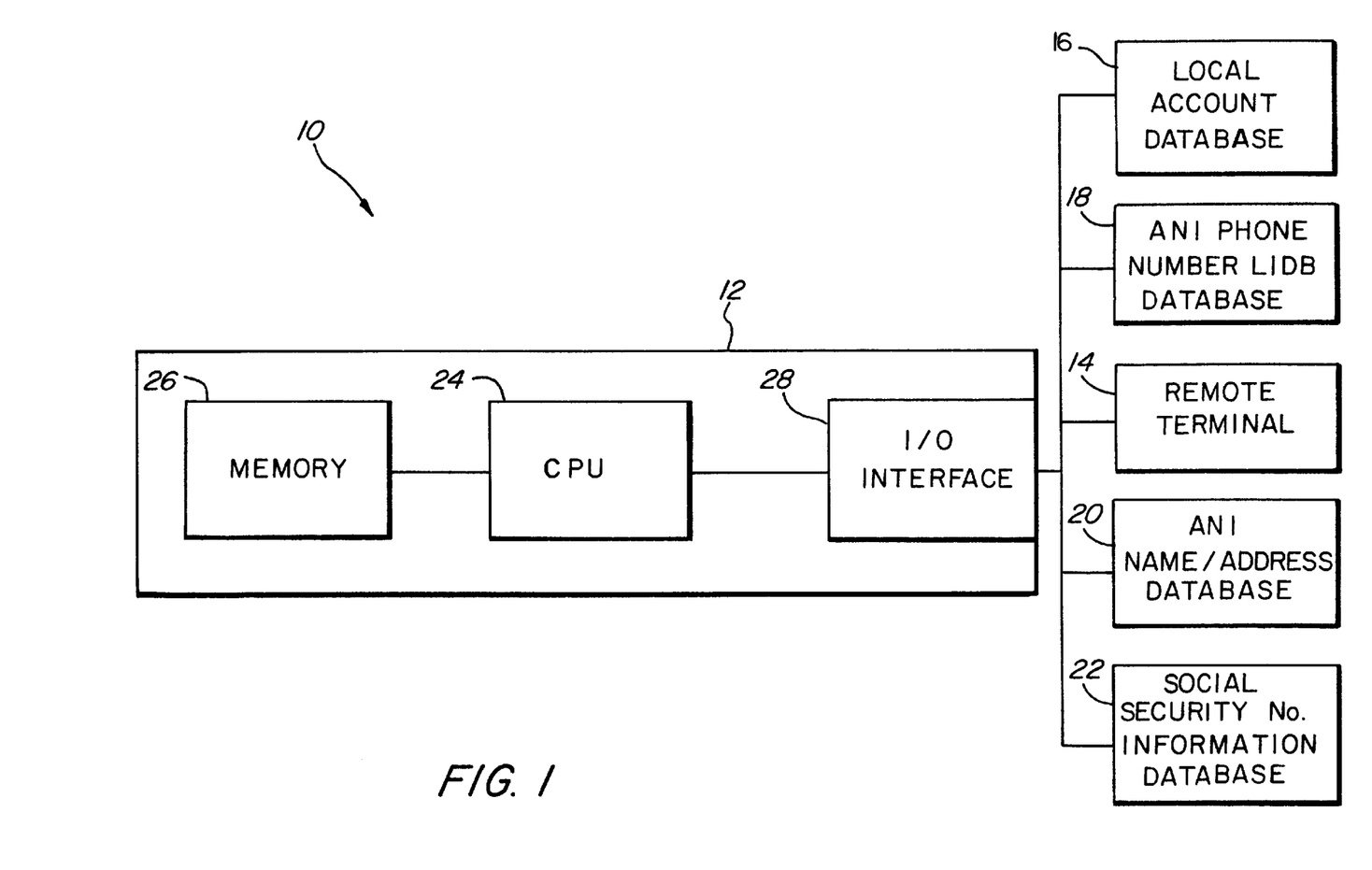
FIG. 1 is a schematic block diagram of a preferred embodiment of the enhanced fraud detection system for automated electronic purchases of the present invention.

Referring now to FIG. 1, a schematic block diagram of the components of the enhanced fraud detection system 10 for automated electronic purchases of the present invention is illustrated. The system 10 includes a central station 12, a remote terminal 14, a local account information database 16 containing account information about purchasers as identified by their social security number, a large information database (LIDB) 18 containing phone numbers associated with prior fraudulent usage, a name/address database 20 containing names and addresses associated with respective phone numbers, and a social security number information database 22. Central station 12 includes a processing unit 24, memory 26, and input/output (I/O) interface 28. Processing unit 24 may include a central processing unit (CPU), microprocessor, or other similar processing device. Central station 12 is connected to remote terminal 14 and the various databases 16–22 via communication links, such as telephone lines, RF links, or any other data transmission technique.

Figure 2:
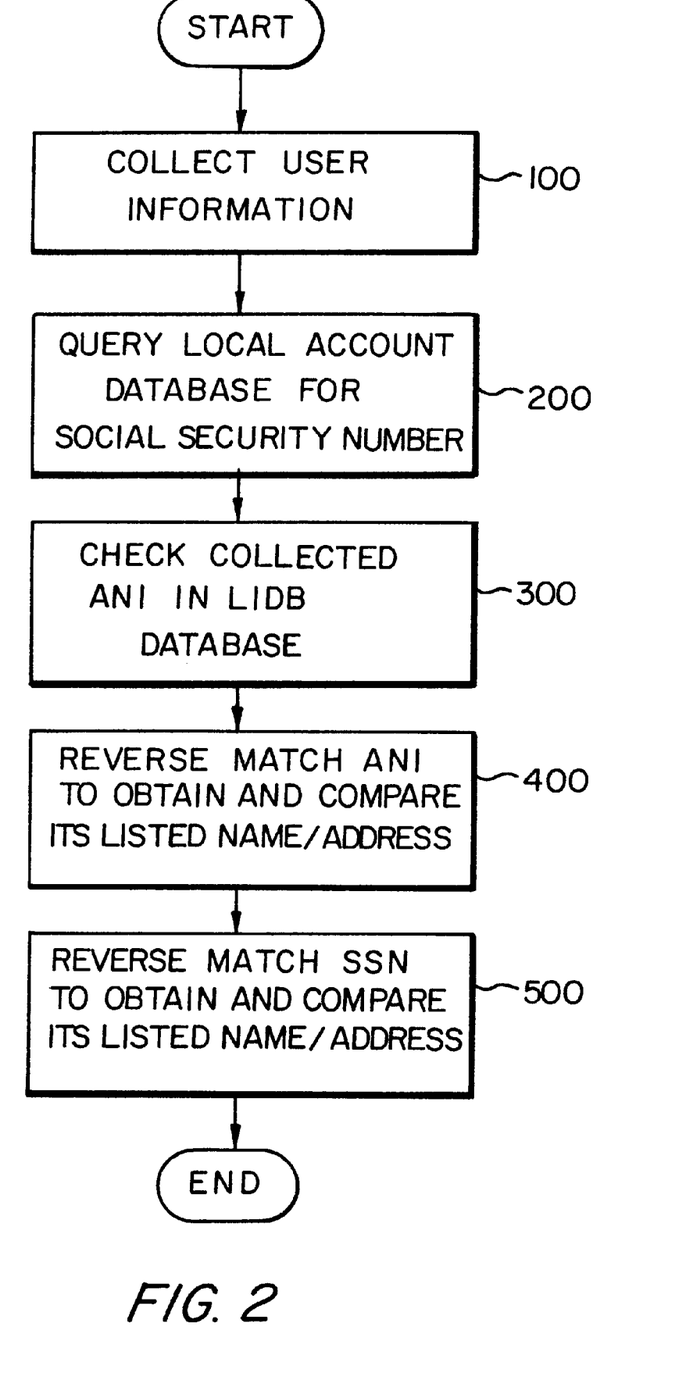
FIG. 2 is an operational block diagram of a preferred method of the present invention for enhanced fraud detection in automated electronic purchases.
Figure 3:
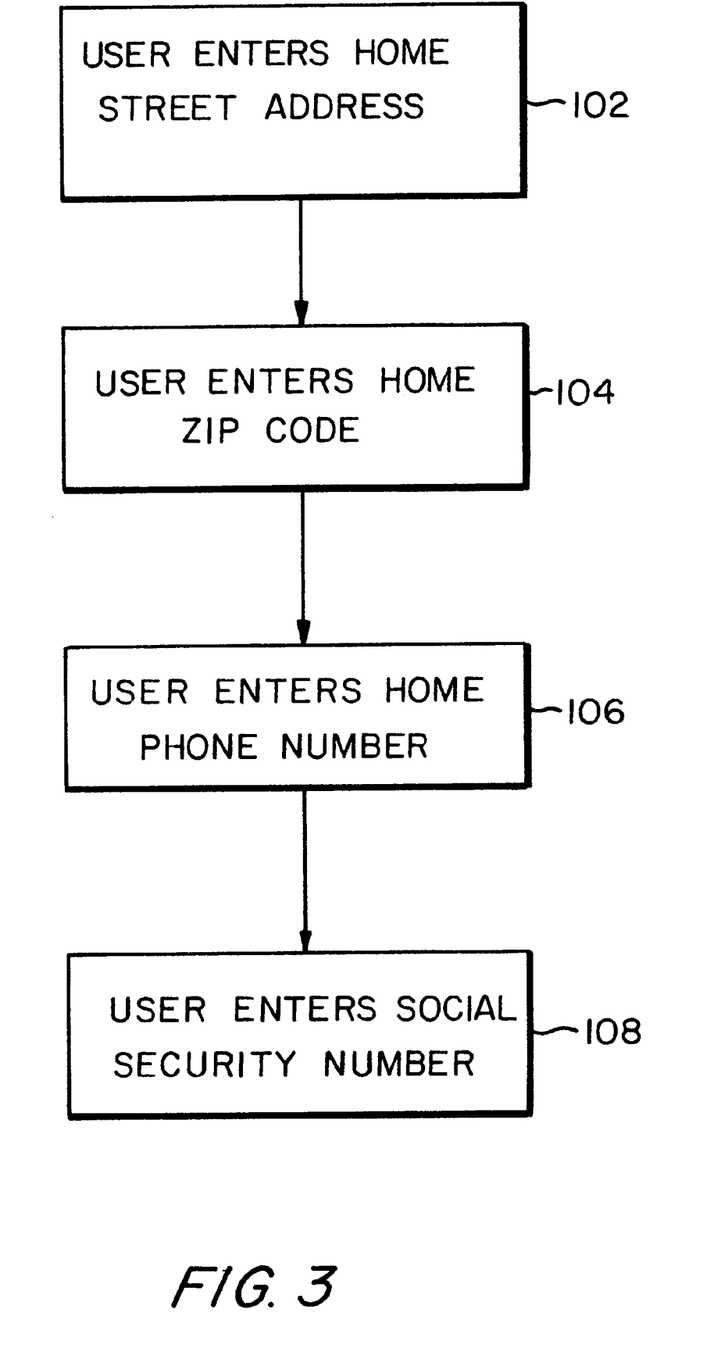
FIG. 3 is an operational block diagram of the user information collection process in the methods of the present invention for enhanced fraud detection in automated electronic purchases.

The operation of the enhanced fraud detection system 10 for automated electronic purchases is illustrated in the flow diagram of FIG. 2. A user at remote terminal 14 attempting to make a purchase is connected to communicate with central station 12. Remote terminal 14 may include a telephone, personal computer, or any other device through which data may be input and transmitted to central station 12. From instructions stored in memory 26, processing unit 24 initially prompts the user attempting to make the purchase to input information about the user necessary for billing the user for the purchase in step 100. The particular information collected in step 100 is illustrated in FIG. 3, where the user is prompted to enter the user's home street address in step 102, home zip code in step 104, home telephone number in step 106, and social security number in step 108.

The input user information is transmitted to and received by central station 12, where such information is stored in memory 26. The information input by the user is later retrieved from memory 26 and used for identification purposes. While the preferred embodiments of the present invention will be described in accordance with a system for performing automated electronic purchases, it is understood that the enhanced fraud detection system 10 can also be employed in a system where the user information is supplied to the vendor and the vendor inputs the necessary user information into the enhanced fraud detection system 10.

Figure 4:
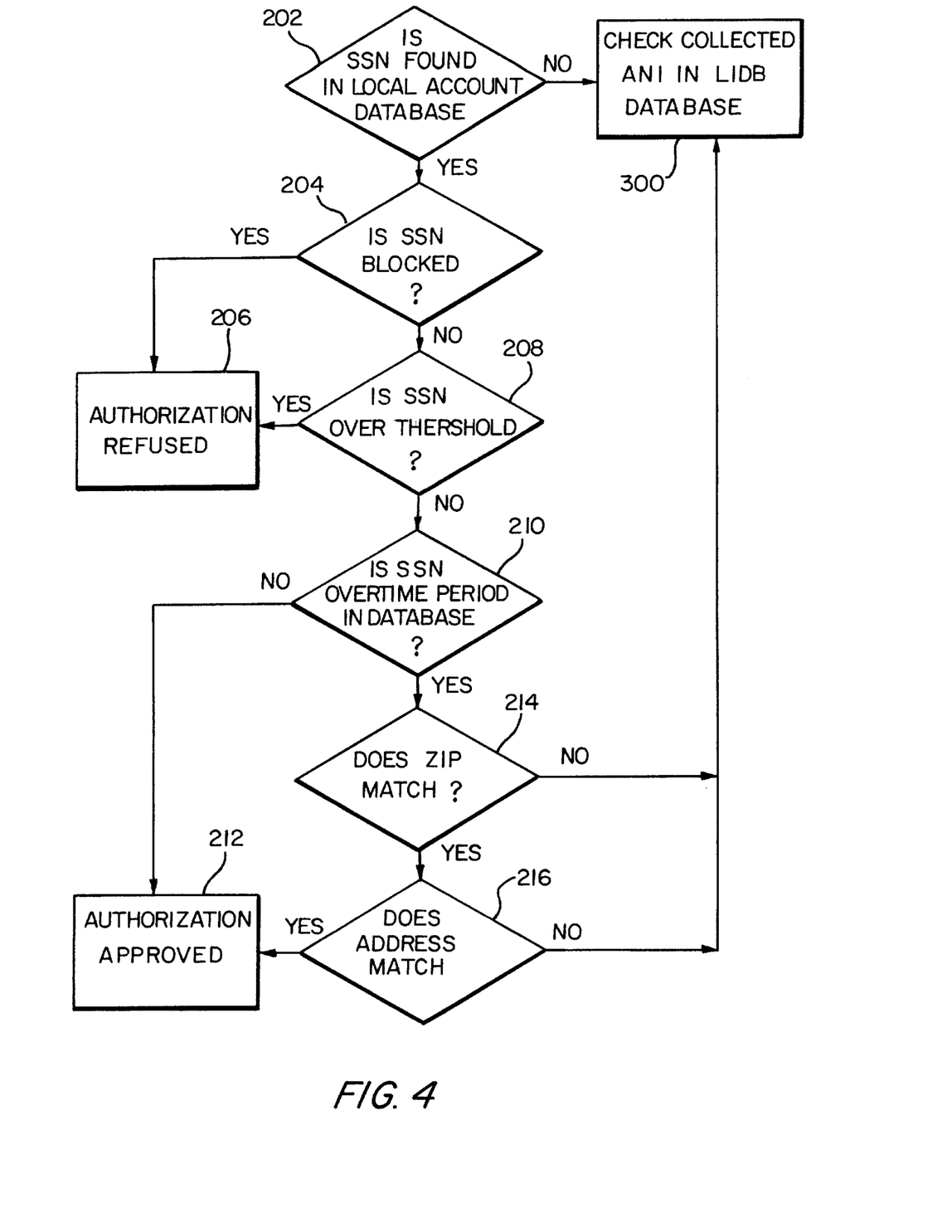
FIG. 4 is an operational block diagram of the local account database query process in the methods of the present invention for enhanced fraud detection in automated electronic purchases.

In order to confirm that a valid billing address has been provided by the user, the input address, telephone, and social security number information is submitted to a local account database 16 in step 200. The local account database 16 contains account information about customers of the particular vendor, where the customer accounts are identified by the customers' social security numbers. FIG. 4 illustrates the operation of the local account database 16 query in a flow diagram. A comparison is made in step 202 to determine if the social security number input by the user corresponds to a social security number found in the local account database 16. When there is no social security number in the local account database 16 found to correspond to the input social security number, it is determined that the user does not have an account in the local account database 16 and the enhanced fraud detection system 10 moves on to step 300 for billing address verification procedures utilized in association with users attempting a purchase without a previously existing account with the vendor. If a match is found, then the user has an existing account in the local account database 16 which can be accessed for further verification procedures.

Once the input social security number is found in the local account database, it is determined whether the account associated with the social security number has been blocked from further purchases by the vendor in step 204. The account could be blocked for any number of reasons, such as a history of fraudulent use associated with the account or overdue payments from prior purchases on the account. Authorization for the purchase transaction is refused in step 206 when it is determined that the input social security number has been blocked. If the account has not been blocked, then the account is checked to ensure that the account has not exceeded a predetermined threshold amount in step 208. The predetermined threshold can be set uniformly for all accounts or can be individually set by the vendor in the local account database 16 for each social security number, thus providing flexibility to the vendor in selecting the predetermined threshold. Authorization for the purchase transaction is refused in step 206 when it is determined that the user's account has already exceeded the predetermined threshold.

The threshold check is performed to ensure that the user has not exceeded a predetermined expenditure limit within a given time period. For example, the user may be limited to certain amount of expenditures each day, each week, each month, etc. The time periods are of the rolling variety where the last given number of days prior to the attempted transaction are monitored for the threshold check. The criteria to be used in each threshold check is determined by the type of goods or services to which the electronic purchase transaction relates. By utilizing an expenditure threshold, the enhanced fraud detection system 10 also limits the number of fraudulent transactions which may be performed by a user who has obtained all of the necessary information to satisfy the tests for authorization.

If the user's account is beneath the predetermined threshold, then a determination is made in step 210 as to the length of time the user's account associated with the input social security number has been in existence in the local account database 16. When the user's account has existed in the local account database 16 for less than a predetermined time period selected by the vendor, i.e. 30 days, authorization for the purchase transaction is approved in step 212. Step 210 is aimed at preventing purchase transactions from users who have changed addresses since obtaining an account with the vendor. Authorization is approved for newly established accounts, because there is higher likelihood that the user is still at the billing address provided to the vendor when recently establishing the account. If the user's account has been in existence in the local account database 16 for longer than the predetermined time period, then in steps 214 and 216 the home billing address input by the user is compared with the billing address stored with the user's account associated with the input social security number to ensure that they match. When a match exists between the stored billing address and the zip code and street address input by the user, authorization for the purchase transaction is approved in step 212. If either the input zip code or input street address fail to match the stored billing address in the local account database 16, the enhanced fraud detection system 10 moves on to step 300 for further billing address verification procedure.

Figure 5:
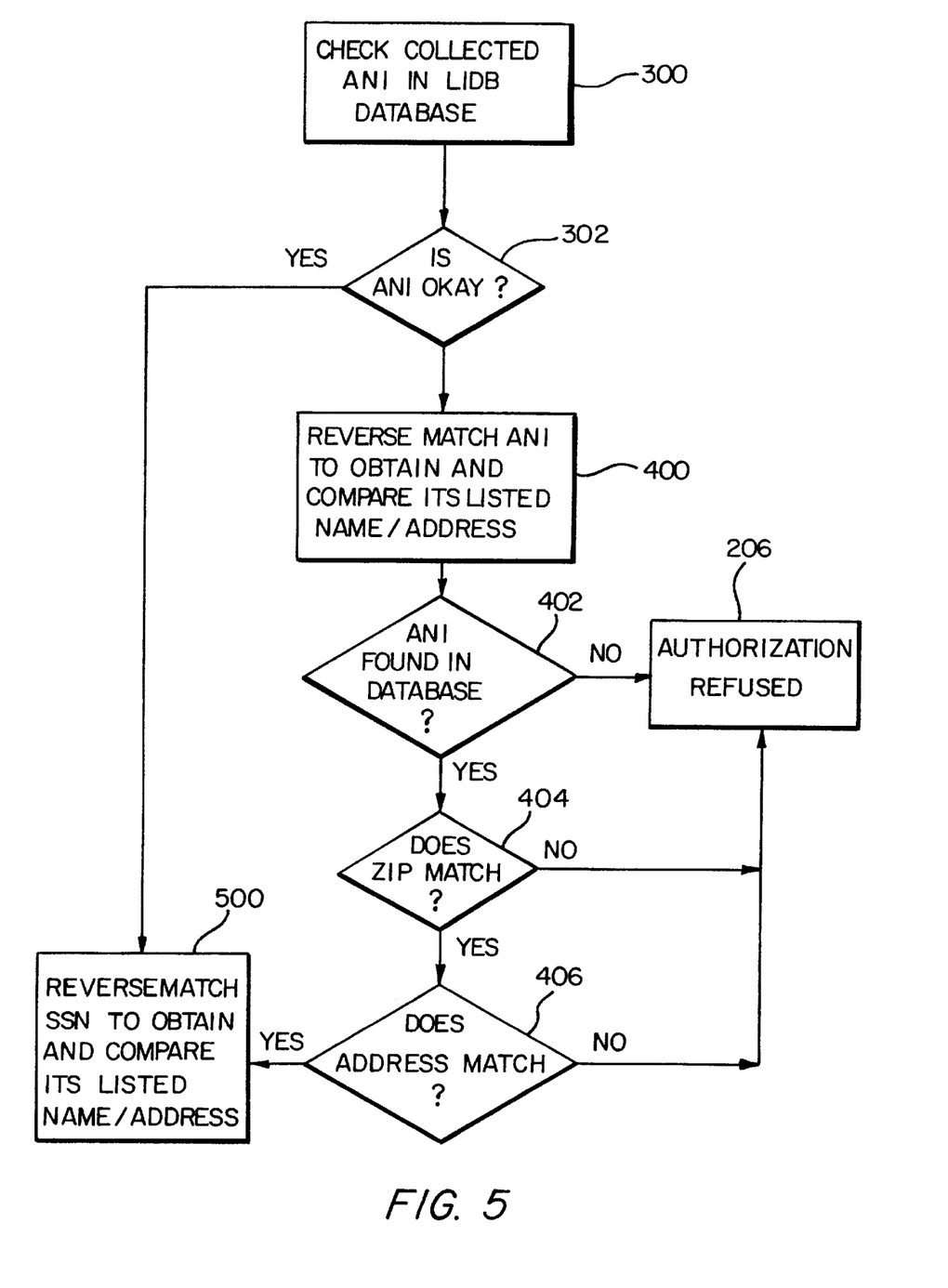
FIG. 5 is an operational block diagram of the processes utilizing the automated number identification information in the methods of the present invention for enhanced fraud detection in automated electronic purchases.

As a further fraud detecting measure, the enhanced fraud detection system 10 may employ automatic number identification (ANI) blocking in addition to the main authorization procedure, as shown in FIG. 5. In step 300, the phone number from which the remote terminal 14 is communicating is automatically collected by central station 12 from the phone provider and stored in memory 26. Further, in step 300, a list of phone numbers stored in large information database (LIDB) 18 is accessed and compared with the collected phone number to determine if the collected phone number is present in the LIDB 18, wherein the phone numbers stored in LIDB 18 include information stored therewith associated with the trustworthiness of the particular phone numbers against fraudulent usage. For instance, phone numbers with which there has been a history of fraudulent usage or failure to pay debts are stored as blocked numbers. A determination is made in step 302 whether the collected ANI phone number is blocked. If the collected ANI phone number is not blocked, the enhanced fraud detection procedure advances to step 500 where the social security number input by the user is used for further address verification procedures.

When the collected ANI phone number appears on the stored list of blocked phone numbers, a separate ANI name/address database 20 containing phone numbers and associated names and addresses is accessed in step 400 to retrieve the addresses associated with the collected ANI phone number. In step 402, a determination is made as to whether the collected ANI phone number appears in the ANI name/address database 20. For phone numbers appearing in database 20, a comparison is made in steps 404 and 406 to determine if the retrieved addresses match the zip code and street address input by the user. If a match occurs, then the enhanced fraud detection procedure advances to the steps associated with the central social security number database 22 in step 500. If the collected phone number does not appear in the ANI name/address database 20 or if no match occurs between a retrieved address and the input address, then authorization for the purchase is refused in step 206. ANI blocking can be useful in preventing continued fraudulent use from a particular phone number known to have a large amount of fraudulent use associated therewith, and ANI blocking may be selectively employed to accomplish this result. In an alternative embodiment of the present invention, all steps associated with the collected ANI phone number are omitted from the enhanced fraud detection procedure, where the fraud detection procedure would advance immediately to step 500 upon receiving negative responses in the queries in any of steps 202, 214, and 216.

Figure 6:
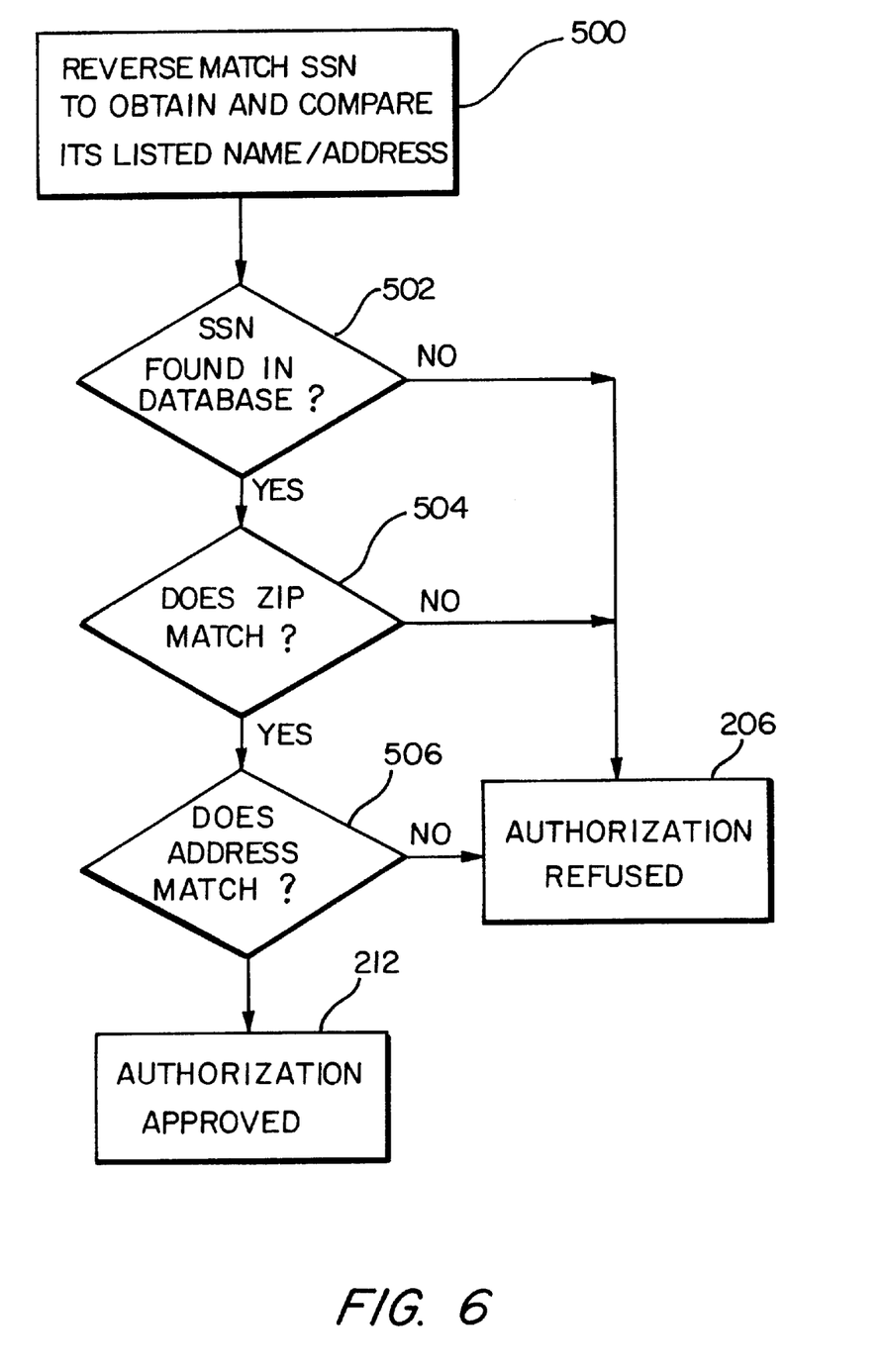
FIG. 6 is an operational block diagram of the social security number database query process in the methods of the present invention for enhanced fraud detection in automated electronic purchases.

In step 500, a database 22 having a list of social security numbers stored therein is accessed, as illustrated by the procedure set forth in FIG. 6. Each of the stored social security numbers includes at least one address stored therewith corresponding to an address of an individual identified by the respective social security number. Since individuals often have more than one residence or move frequently, multiple addresses may be stored with each social security number identifying that individual. The social security number input by the user is compared with the stored list of social security numbers in step 502 to confirm that the input social security number is an actual social security number appearing on the list. The addresses stored in association with the input social security number are then retrieved, and the billing address input by the user is compared with the retrieved stored addresses in steps 504 and 506 to determine if the input billing address corresponds to any of the retrieved stored addresses. If a match exists between the input billing address and any of the addresses stored in association with the input social security number, the electronic purchase transaction is authorized to transpire in step 212. The electronic purchase transaction is denied in step 206 when the input address fails to match any of the stored addresses or if the input social security number is not found in the social security number database 22.

By utilizing the information stored in social security number information database 22, the number of fraudulent electronic purchase transactions allowed can be greatly reduced. Personal identification identifying an individual is typically carried by an individual within the individual's wallet or purse, for instance, most individuals carry their driver's licenses in their wallets. Therefore, if an individual's wallet is lost or stolen, a person coming into possession of the wallet will have access to the individual's name and address. In order to assist in preventing a fraudulent address from being provided by a purchaser, the present invention requires the purchaser to know the social security number of the individual's name provided to the vendor. Since most people do not carry their social security number on their person, this identifying data will not be readily available to a person who fraudulently comes into possession of an individual's personal identification.

Furthermore, social security numbers inherently provide reliable identification of individuals, since they are unique to each individual as assigned by the U.S. Government. By storing information about an individual in association with the individual's social security number, as occurring in databases 16 and 22, personal information about the individual is stored in association with a unique number which particularly identifies the individual. This provides a high degree of certainty that the user himself is attempting the purchase transaction when all of the information input by the user matches the stored information in databases 16 and 22. Additionally, an individual's past history of fraudulent purchases can be stored along with their social security number, so that this history of fraudulent transactions will be known to vendors after accessing the social security number database during the authorization procedure. The vendors could then deny the electronic purchase transaction if the individual has a history of fraudulent transactions, even if the transaction would otherwise be authorized.

The address comparison procedure performed in steps 214 and 216, 404 and 406, and 504 and 506 will be described in greater detail. A typical address has a field containing the actual street address, the name and/or number of the street, the city, the state, and the zip code. For example, "123 45$^{th}$ Street" contains the street address "123" and the street number "45." The user is prompted to input his actual street address, street name/number, and zip code. Initially, the zip code input by the user is compared with the zip code retrieved from the respective database. A typical city, state, and zip code address appears as "Anytown, State 12345." Thus, processing unit 24 determines whether the last term in the city, state, zip code address stored in a respective database matches the input zip code. If none of the stored zip codes match the zip code input by the user, authorization for the electronic purchase transaction is refused.

If the input zip code and a stored zip code match, the enhanced fraud detection system 10 moves on to compare the street address input by the user with the street address contained in the respective database. If the street addresses are different from one another, the input billing address is further analyzed to ascertain whether the word "BOX" appears in the input billing address in order to determine if the input address is a Post Office Box or APO address. If the word "BOX" is found, the term following "BOX" is assumed to be the box number and the input box number is compared with the box number contained in the retrieved stored addresses. If either the word "BOX" is not found to be present in the input billing address or a match is not found between box numbers, then it is determined that the input address information fails to match the stored address information in the respective databases and the electronic purchase transaction is denied.

If a match exists between the input street address and the stored address in a respective database, the address verification procedure for the electronic purchase transaction is satisfied and the transaction is authorized to transpire. In alternative embodiments of the present invention, other variations in the address information collected and compared may be performed without departing from the spirit and scope of the present invention.

As can be seen from the foregoing, the system and method for enhanced fraud detection in automated electronic purchase transactions performed in accordance with the present invention will reduce the number of fraudulent electronic purchase transactions by reliably verifying the billing address of the purchaser is current and correct. Moreover, the system and method for enhanced fraud detection in automated electronic purchase transactions performed in accordance with the present invention will minimize fraudulent purchases by utilizing identifying social security number data that is not readably attainable or accessible by a fraudulent user and which particularly and reliably identifies an individual.

In each of the above embodiments, the different methods of preventing fraudulent purchase transactions by the enhanced fraud detection system of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of authorizing an electronic purchase transaction, comprising the steps of:

generating a request for a user at a remote terminal to input the user's billing address and social security number;

receiving the information input by the user;

communicating the input user information to an account database containing existing customer accounts identified by the respective social security numbers of the customers to determine whether the input social security number corresponds to an existing customer account;

determining whether the customer account associated with the input social security number is authorized for the purchase transaction when the input social security number corresponds to an existing customer account;

determining whether the customer account associated with the input social security number has existed in the account database for longer than a predetermined time period;

authorizing the electronic purchase transaction if the customer account associated with the input social security number has existed in the account database for less than the predetermined time period;

comparing the input user billing address with a customer billing address stored in the account database along with the respective customer account when the customer account associated with the input social security number has existed in the account database for longer than a predetermined time period; and authorizing the electronic purchase transaction when the input billing address is determined to correspond to the stored billing address in the account database.

2. The method of authorizing an electronic purchase transaction as defined in claim 1, further comprising the steps of:

accessing a remote database having a list of social security numbers stored therein when there is not an existing customer account in the account database for the input social security number, wherein each of the stored social security numbers includes at least one address stored therewith corresponding to an address of an individual identified by the respective social security number;

retrieving the stored addresses from the remote database associated with the input social security number;

comparing the input address with the retrieved stored addresses to determine if the input address matches any of the retrieved stored addresses; and authorizing the electronic purchase transaction when the input user billing address is determined to correspond to a retrieved address stored in association with the social security number input by the user.

3. An automated system for authorizing an electronic purchase transaction, comprising:

inquiry means for requesting a user at a remote terminal to input the user's billing address and social security number;

receiving means for collecting the information input by the user;

communicating means for delivering the input user information to an account database containing existing customer accounts identified by the respective social security numbers of the customers to determine whether the input social security number corresponds to an existing customer account; and determining means for determining whether the customer account associated with the input social security number is authorized for the purchase transaction when the input social security number corresponds to an existing customer account;

wherein said determining means further:

determines whether the customer account associated with the input social security number has existed in the account database for longer than a predetermined time period, authorizes the electronic purchase transaction if the customer account associated with the input social security number has existed in the account database for less than the predetermined time period, compares the input user billing address with a customer billing address stored in the account database along with the respective customer account when the customer account associated with the input social security number has existed in the account database for longer than a predetermined time period, and authorizes the electronic purchase transaction when the input billing address is determined to correspond to the stored billing address in the account database.

4. The automated system for authorizing an electronic purchase transaction as defined in claim 3, further comprising:

retrieval means for accessing a database having a list of social security numbers stored therein when there is not an existing customer account in the account database and retrieving at least one address stored in association with the social security number input by the user, wherein each of the stored social security numbers includes at least one address stored therewith corresponding to an address of an individual identified by the respective social security number;

processing means for comparing the input billing address with the retrieved stored addresses to determine if the input billing address matches any of the retrieved stored addresses; and authorizing means for authorizing the electronic purchase transaction when the input user billing address is determined to correspond to a retrieved address stored in association with the social security number input by the user.

5. The method of authorizing an electronic purchase transaction as defined in claim 1, wherein the step of determining whether the customer account associated with the input social security number is authorized for the purchase transaction further comprises the steps of:

determining whether the customer account associated with the input social security number has been blocked from further electronic purchase transactions; and rejecting authorization if the customer account associated with the input social security number has been blocked from further usage.

6. The method of authorizing an electronic purchase transaction as defined in claim 1, further comprising the steps of:

determining whether the customer account associated with the input social security number has exceeded a predetermined expenditure limit within a given time period; and rejecting authorization if the predetermined expenditure limit has been exceeded.

7. The method of authorizing an electronic purchase transaction as defined in claim 1, further comprising the steps of:

collecting a phone number from which the remote terminal is communicating;

comparing the collected phone number with a stored list of blocked phone numbers which are not authorized to perform electronic purchase transactions prior to accessing the social security number database; and proceeding to the steps accessing and utilizing information stored in the social security number database when the collected phone number does not appear on the stored list of blocked phone numbers.

8. The method of authorizing an electronic purchase transaction as defined in claim 7, further comprising the steps of:

accessing a name/address database containing a list of names and addresses stored therein along with respective phone numbers when the collected phone number matches any of the phone numbers on the stored list of blocked phone numbers;

retrieving the stored addresses associated with the collected phone number;

comparing the input billing address with the retrieved stored addresses to determine if the input billing address matches any of the retrieved stored addresses; and proceeding to the steps accessing and utilizing information stored in the social security number database when the input billing address matches any of the retrieved stored addresses.

9. The method of authorizing an electronic purchase transaction as defined in claim 1, further comprising the steps of:

delivering a negative response to the user indicating that the electronic purchase transaction is being refused when authorization is not granted; and notifying the user of the reason for which the purchase transaction is refused.

10. The method of authorizing an electronic purchase transaction as defined in claim 1, wherein the address input by the user includes the street address and zip code of the user which are compared with the retrieved stored addresses in the social security database to determine if the input street address and zip code match any of the street addresses and zip codes in the retrieved stored addresses.

11. The method of authorizing an electronic purchase transaction as defined in claim 10, further comprising the step of determining whether the input street address is a P.O. Box or a street name and number prior to comparing the input and stored addresses.

12. The method of authorizing an electronic purchase transaction as defined in claim 1, wherein the entire authorization procedure is automated without the need for human intervention.

13. The automated system for authorizing an electronic purchase transaction of claim 3, wherein said determining means further determines whether the customer account associated with the input social security number has been blocked from further electronic purchase transactions and rejects authorization if the customer account associated with the input social security number has been blocked from further usage.

14. The automated system for authorizing an electronic purchase transaction of claim 3, wherein said determining means further includes delimiting means for determining whether the customer account associated with the input social security number has exceeded a predetermined expenditure limit within a given time period and rejects authorization if the predetermined expenditure limit has been exceeded.

15. The automated system for authorizing an electronic purchase transaction of claim 3, further comprising:

number identification means for collecting a phone number from which the remote terminal is communicating; and comparison means for comparing the collected phone number with a stored list of blocked phone numbers which are not authorized to perform electronic purchase transactions prior to accessing the social security number database and proceeding to the steps associated with said retrieval means for accessing and utilizing information stored in the social security number database when the collected phone number does not appear on the stored list of blocked phone numbers.

16. The automated system for authorizing an electronic purchase transaction of claim 3, further comprising address identification means for accessing a name/address database containing a list of names and addresses stored therein along with respective phone numbers when the collected phone number matches any of the phone numbers on the stored list of blocked phone numbers, retrieving the stored addresses associated with the collected phone number, comparing the input billing address with the retrieved stored addresses to determine if the input billing address matches any of the retrieved stored addresses, and proceeding to the steps accessing and utilizing information stored in the social security number database when the input billing address matches any of the retrieved stored addresses.

17. The automated system for authorizing an electronic purchase transaction of claim 3, further comprising notification means for generating a negative response to the user indicating that the electronic purchase transaction is being refused when authorization is not granted and notifying the user of the reason for which the electronic purchase transaction is refused.

18. The automated system for authorizing an electronic purchase transaction of claim 3, wherein the address input by the user includes the street address and zip code of the user, said processing means further comparing the input street address and zip code with the retrieved stored addresses in the social security database to determine if the input street address and zip code match any of the street addresses and zip codes in the retrieved stored addresses.

19. The automated system for authorizing an electronic purchase transaction of claim 18, wherein said processing means determines whether the input street address in a P.O. Box or a street name and number prior to comparing the input address with the stored addresses.

20. The automated system for authorizing an electronic purchase transaction of claim 3, wherein the entire system is automated without the need for human intervention.

21. An automated system for authorizing an electronic purchase transaction, comprising:

an inquiry device for requesting a user at a remote terminal to input the user's billing address and social security number;

a receiving device for collecting the information input by the user;

a communication device for delivering the input user information to an account database containing existing customer accounts identified by the respective social security numbers of the customers to determine whether the input social security number corresponds to an existing customer account; and a determining device for determining whether the customer account associated with the input social security number is authorized for the purchase transaction when the input social security number corresponds to an existing customer account;

wherein said determining device further:

determines whether the customer account associated with the input social security number has existed in the account database for longer than a predetermined time period, authorizes the electronic purchase transaction if the customer account associated with the input social security number has existed in the account database for less than the predetermined time period, compares the input user billing address with a customer billing address stored in the account database along with the respective customer account when the customer account associated with the input social security number has existed in the account database for longer than a predetermined time period, and authorizes the electronic purchase transaction when the input billing address is determined to correspond to the stored billing address in the account database.

22. The automated system for authorizing an electronic purchase transaction of claim 21, wherein said determining device further determines whether the customer account associated with the input social security number has been blocked from further electronic purchase transactions and rejects authorization if the customer account associated with the input social security number has been blocked from further usage.

23. The automated system for authorizing an electronic purchase transaction of claim 21, wherein said determining device further determines whether the customer account associated with the input social security number has exceeded a predetermined expenditure limit within a given time period and rejects authorization if the predetermined expenditure limit has been exceeded.

24. The automated system for authorizing an electronic purchase transaction of claim 21, further comprising:

a number identification device for collecting a phone number from which the remote terminal is communicating; and a comparison device for comparing the collected phone number with a stored list of blocked phone numbers which are not authorized to perform electronic purchase transactions prior to accessing the social security number database and accessing and utilizing information stored in the social security number database when the collected phone number does not appear on the stored list of blocked phone numbers.

25. The automated system for authorizing an electronic purchase transaction of claim 21, further comprising an address identification device for accessing a name/address database containing a list of names and addresses stored therein along with respective phone numbers when the collected phone number matches any of the phone numbers on the stored list of blocked phone numbers, retrieving the stored addresses associated with the collected phone number, comparing the input billing address with the retrieved stored addresses to determine if the input billing address matches any of the retrieved stored addresses, and accessing and utilizing information stored in the social security number database when the input billing address matches any of the retrieved stored addresses.

26. The automated system for authorizing an electronic purchase transaction of claim 21, further comprising a notification device for generating a negative response to the user indicating that the electronic purchase transaction is being refused when authorization is not granted and notifying the user of the reason for which the electronic purchase transaction is refused.

* * * * *